US011515925B2

(12) United States Patent
Koskela et al.

(10) Patent No.: US 11,515,925 B2
(45) Date of Patent: Nov. 29, 2022

(54) SELECTING AND USING A SUBSET OF BEAM FAILURE DETECTION RESOURCES

(71) Applicant: Nokia Technologies Oy, Espoo (FI)

(72) Inventors: Timo Koskela, Oulu (FI); Samuli Turtinen, Ii (FI); Mihai Enescu, Espoo (FI); Sami-Jukka Hakola, Kempele (FI); Jorma Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 54 days.

(21) Appl. No.: 17/049,297

(22) PCT Filed: May 7, 2019

(86) PCT No.: PCT/FI2019/050353
§ 371 (c)(1),
(2) Date: Oct. 20, 2020

(87) PCT Pub. No.: WO2019/215389
PCT Pub. Date: Nov. 14, 2019

(65) Prior Publication Data
US 2021/0242922 A1    Aug. 5, 2021

Related U.S. Application Data

(60) Provisional application No. 62/668,934, filed on May 9, 2018.

(51) Int. Cl.
*H04B 7/06* (2006.01)
*H04B 7/08* (2006.01)
(Continued)

(52) U.S. Cl.
CPC ........... *H04B 7/0695* (2013.01); *H04B 7/088* (2013.01); *H04W 24/08* (2013.01);
(Continued)

(58) Field of Classification Search
CPC ........ H04B 7/0695; H04B 7/088; H04B 7/06; H04B 7/08; H04W 24/08; H04W 72/042;
(Continued)

(56) References Cited

U.S. PATENT DOCUMENTS

2016/0173182 A1* 6/2016 Jöngren ............... H04B 7/0456
370/329
2017/0346544 A1* 11/2017 Islam .................. H04B 7/0814
(Continued)

OTHER PUBLICATIONS

Office action received for corresponding Japanese Patent Application No. 2020-556902, dated Jan. 24, 2022, 7 pages of office action and 5 pages of translation available.
(Continued)

*Primary Examiner* — Mewale A Ambaye
(74) *Attorney, Agent, or Firm* — Squire Patton Boggs (US) LLP

(57) ABSTRACT

According to an example aspect of the present invention, there is provided a method that includes receiving at a user equipment configuration for M active transmission configuration indication states; selecting, according to one or more pre-defined rules, based on the configured M active transmission configuration indication states, a subset of N of the set of M transmission configuration indication states, where N<M; and determining by the user equipment beam failure detection resources based on the selected N transmission configuration indication states.

15 Claims, 7 Drawing Sheets

(51) Int. Cl.
 *H04W 24/08* (2009.01)
 *H04W 72/04* (2009.01)
(52) U.S. Cl.
 CPC ....... *H04W 72/042* (2013.01); *H04W 72/046* (2013.01); *H04W 72/0493* (2013.01)
(58) Field of Classification Search
 CPC ........... H04W 72/046; H04W 72/0493; H04W 72/0433; H04W 16/28; H04W 36/30
 See application file for complete search history.

(56) References Cited

U.S. PATENT DOCUMENTS

| | | | | |
|---|---|---|---|---|
| 2020/0314708 | A1* | 10/2020 | Jassal | H04W 16/28 |
| 2020/0336921 | A1* | 10/2020 | Yerramalli | H04W 16/28 |
| 2020/0350972 | A1* | 11/2020 | Yi | H04B 7/088 |
| 2021/0021330 | A1* | 1/2021 | Khoshnevisan | H04B 7/0617 |
| 2021/0136604 | A1* | 5/2021 | Zhou | H04L 5/001 |

OTHER PUBLICATIONS

"Views on beam recovery", 3GPP TSG RAN WG1 Meeting #90b, R1-1718193, Agenda: 7.2.2.4, NTT Docomo, Oct. 9-13, 2017, pp. 1-9.

"Revised Summary 1 on Remaing issues on Beam Failure Recovery", 3GPP TSG RAN WG1 Meeting #92bis, R1-1805583, Agenda: 7.1.2.2.4, MediaTek Inc, Apr. 16-20, 2018, 17 pages.

Office action received for corresponding Bangladesh Patent Application No. 113/2019, dated Aug. 18, 2020, 2 pages.

Extended European Search Report received for corresponding European Patent Application No. 19799022.9, dated Oct. 29, 2021, 14 pages.

"Remaining issues on beam failure recovery", 3GPP TSG RAN WG1 Meeting #92, R1-1801825, Agenda: 7.1.2.2.4, Lenovo, Feb. 26-Mar. 2, 2018, 4 pages.

"Summary of remaining issues on beam failure recovery", 3GPP TSG RAN WG1 Meeting #92bis, R1-1803637, Agenda: 7.1.2.2.4, Huawei, Apr. 16-20, 2018, 13 pages.

"Remaining issues on RLM for mobility management", 3GPP TSG RAN WG1 Meeting #92bis, R1-1805038, Agenda: 7.1.1.5.2, NTT Docomo, Inc., Apr. 16-20, 2018, 3 pages.

"On 4-step RACH procedure", 3GPP TSG RAN WG1 Meeting #90, R1-1713701, Agenda: 6.1.1.4.4, MediaTek Inc., Aug. 21-25, 2017, 6 pages.

"3rd Generation Partnership Project; Technical Specification Group Radio Access Network; NR; Physical layer procedures for control (Release 15)", 3GPP TS 38.213, V15.1.0, Mar. 2018, pp. 1-77.

"3rd Generation Partnership Project; Technical Specification Group Radio Access Network; NR; Medium Access Control (MAC) protocol specification (Release 15)", 3GPP TS 38.321, V15.1.0, Mar. 2018, pp. 1-67.

"Final Report of 3GPP TSG RAN WG1 #92 v1.0.0", 3GPP TSG RAN WG1 Meeting #92bis, R1-1803571, MCC Support, Apr. 16-20, 2018, pp. 1-187.

"Summary 2 on Remaing issues on Beam Failure Recovery", 3GPP TSG RAN WG1 Meeting #92, R1-1803441, Agenda: 7.1.2.2.4, MediaTek Inc, Feb. 26-Mar. 2, 2018, 28 pages.

"Final Report of 3GPP TSG RAN WG1 #92bis v1.0.0", 3GPP TSG RAN WG1 Meeting #93, R1-1805801, MCC Support, May 21-25, 2018, pp. 1-195.

International Search Report and Written Opinion received for corresponding Patent Cooperation Treaty Application No. PCT/FI2019/050353, dated Oct. 28, 2019, 13 pages.

"Remaining Issues for Radio Link Monitoring", 3GPP TSG RAN WG1 Meeting #92bis, R1-1805223, Agenda: 7.1.1.5.2, Ericsson, Apr. 16-20, 2018, 9 pages.

"Remaining Details on Beam Recovery", 3GPP TSG RAN WG1 Meeting #92bis, R1-1805105, Agenda: 7.1.2.2.4, Nokia, Apr. 16-20, 2018, 6 pages.

Giordani et al., "A Tutorial on Beam Management for 3GPP NR at mmWave Frequencies", arXiv, Apr. 5, 2018, pp. 1-22.

Tentative Rejection received for corresponding Taiwan Patent Application No. 108115932, dated Feb. 12, 2020, 18 pages of Tentative Rejection and 4 pages of translation available.

"Text Proposal for Beam Failure Recovery", 3GPP TSG RAN WG1 Meeting #92bis, R1-1804001, Agenda: 7.1.2.2.4, OPPO, Apr. 16-20, 2018, 4 pages.

"Remaining Issues on Beam Failure Recovery", 3GPP TSG RAN WG1 Meeting #92bis, R1-1804059, Agenda: 7.1.2.2.4, MediaTek Inc, Apr. 16-20, 2018, 5 pages.

Decision of Rejection dated Sep. 1, 2022 corresponding to Japanese Patent Application No. 2020-556902, with English translation thereof.

* cited by examiner

| TCI index | Source RS set | Source RS index | QCL type |
|---|---|---|---|
| 0 | RS set #A | SS/PBCH block #n (of set #A) | A + D |
| 1 | RS set #B | TRS #b (of set #B) | A |
| | | CSI-RS #c (of set #B) | D |
| ••• | ••• | ••• | ••• |
| M-1 | RS set #E | CSI-RS #b (of set #E) | A + D |

SELECTING AND USING A SUBSET OF BEAM FAILURE DETECTION RESOURCES

RELATED APPLICATION

This application claims priority to PCT Application No. PCT/FI2019/050353, filed on May 7, 2019, which claims priority to U.S. Provisional Application No. 62/668,934, filed on May 9, 2018, each of which is incorporated herein by reference in its entirety.

TECHNICAL FIELD

This invention relates generally to wireless communications and, more specifically, relates to beam failure detection.

BACKGROUND

Abbreviations that may be found in the specification and/or the drawing figures are defined below, at the beginning of the detailed description section.

Currently in 3GPP, a beam failure recovery procedure is specified. Beam recovery may be also referred to as link reconfiguration. An aim of the beam recovery is to detect when one or multiple serving control channels (PDCCH) links is/are considered to be in failure conditions and to recover the links. To recover a link, a UE initiates signaling toward the network to indicate failure, and indicates a new potential link (e.g., a beam) called a candidate link (e.g., a beam). As a response to a beam failure recovery request received from the UE, the network may configure the UE with a new PDCCH link. Beam recovery is specified by 3GPP in specifications 3GPP TS 38.213 and 3GPP TS 38.321.

Additional details are described below.

DETAILED DESCRIPTION OF THE DRAWINGS

Figure 1:
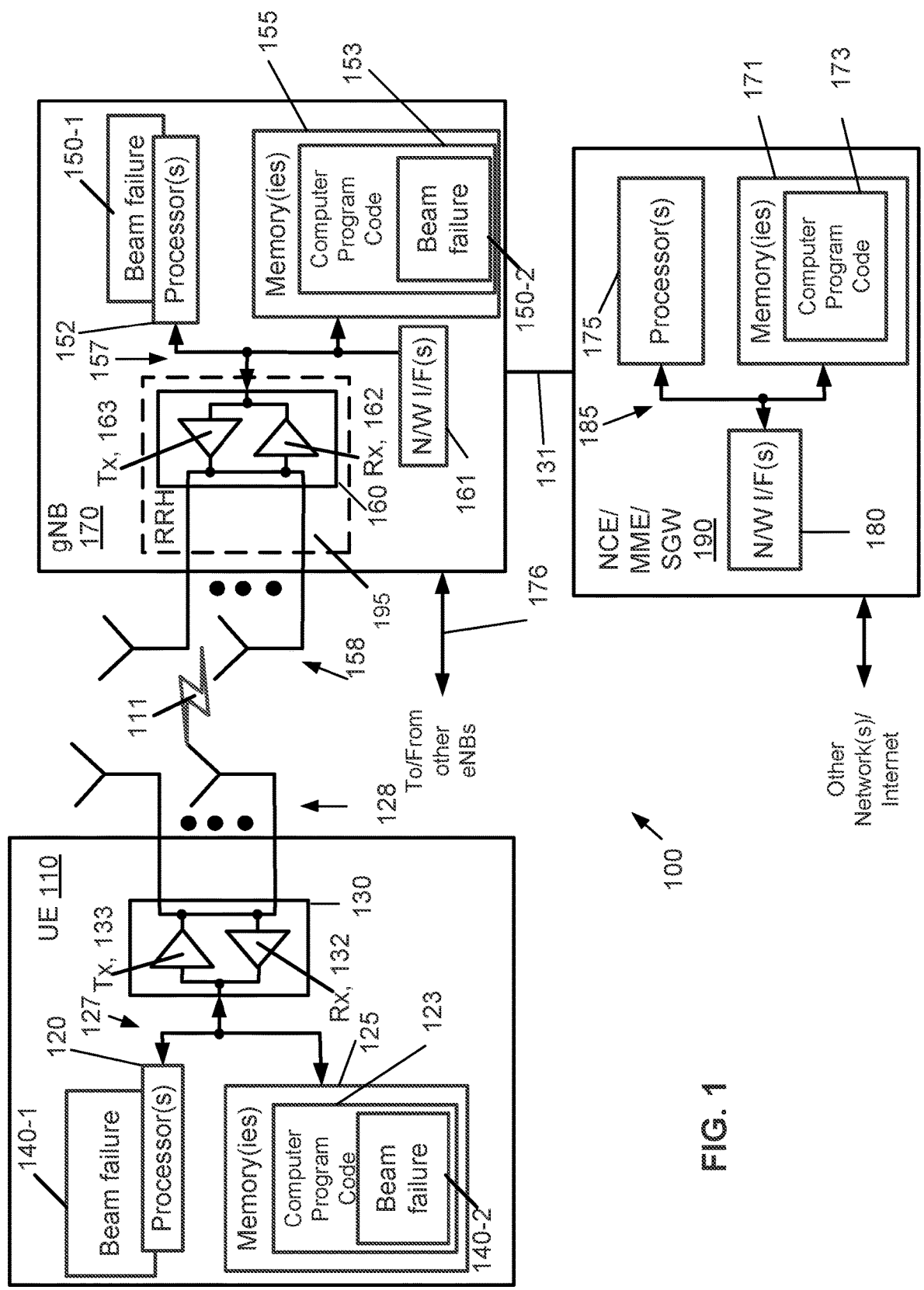
FIG. 1 is a block diagram of one possible and non-limiting exemplary system in which the exemplary embodiments may be practiced.

The following abbreviations that may be found in the specification and/or the drawing figures are defined as follows:

3GPP third generation partnership project
5G fifth generation
BFD-RS beam failure detection reference signal
BWP bandwidth part
CORESET control resource set
C-RNTI cell radio network temporary identifier
CSI-RS channel state information reference signal
DMRS demodulation reference signal
eNB (or eNodeB) evolved Node B (e.g., an LTE base station)
gNB (or gNodeB) base station for 5G/NR
ID identification
I/F interface
L3 layer 3
LTE long term evolution
MAC medium access control
MAC-CE MAC control element
max maximum
MME mobility management entity
NCE network control element
NR new radio
NR-PDCCH new radio-PDCCH
NR-PDSCH new radio-PDSCH
N/W or NW network
PBCH physical broadcast channel
PDCCH physical downlink control channel
PDSCH physical downlink shared channel
QCL quasi colocation
QCL'd quasi-co-located
RACH random access channel
RLM-RS radio link monitoring reference signal
RRH remote radio head
RRC radio resource control
RS reference signal
Rx receiver
SGW serving gateway
SS synchronization signal
SSB synchronization signal block
SS/PBCH synchronization signal/physical broadcast channel
S-P Semi-Persistent
TCI transmission configuration indication
TRP Tx/Rx point
TS technical specification
Tx transmitter
UE user equipment (e.g., a wireless, typically mobile device)

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for selecting and using a subset of beam failure detection resources. Additional description of these techniques is presented after a system into which the exemplary embodiments may be used is described.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a beam failure module 140, comprising one of or both parts 140-1 and/or 140-2, which may be implemented in a number of ways. The beam failure module 140 may be implemented in hardware as beam failure module 140-1, such as being implemented as part of the one or more processors 120. The beam failure module 140-1 may be implemented also as an integrated circuit or through other hardware such as a programmable gate array. In another example, the beam failure module 140 may be implemented as beam failure module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with gNB 170 via a wireless link 111.

The gNB 170 is a base station that provides access by wireless devices such as the UE 110 to the wireless network 100. The gNB 170 is a base station for 5G, also called New Radio (NR). The gNB 170 may also be an eNB (evolved NodeB) base station, for LTE (long term evolution), or any other suitable base station. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The gNB 170 includes a beam failure module 150, comprising one of or both parts 150-1 and/or 150-2, which may be implemented in a number of ways. The beam failure module 150 may be implemented in hardware as beam failure module 150-1, such as being implemented as part of the one or more processors 152. The beam failure module 150-1 may be implemented also as an integrated circuit or through other hardware such as a programmable gate array. In another example, the beam failure module 150 may be implemented as beam failure module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the user equipment 110 can include, but are not limited to, cellular telephones such as smart phones, tablets, personal digital assistants (PDAs) having wireless communication capabilities, Internet of Things (IoT) devices, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity. The rest of this document is divided into sections, for ease of reference.

I. Additional Introduction to this Technology Field

This section contains additional introductory material for this technology field.

I.a. Beam Failure Detection RS

The network (e.g., the gNB 170) configures the UE 110 with a set of reference signals for monitoring the quality of the link for beam failure detection. This set may be referred as set of q0 or beam failure detection RS or BFD-RS. Typically, BFD-RS(s) are configured to be spatially quasi-co-located with PDCCH DMRS. That is, these reference signals correspond to downlink beams used to transmit PDCCH. Downlink beams are identified by reference signal, either SS/PBCH block index or CSI-RS resource index. SS/PBCH or SSB may be referred to using with SSB resource index or with SSB time location index. The network may configure the BFD-RS list explicitly using RRC signaling. It may also be possible to define way to indicate BFD-RS using RRC signaling to configure set of BFD-RS and activate subset of resources using MAC CE. In some embodiments it may be possible to define the set of q0 to include reference signals corresponding to PDSCH beams. Similar TCI framework may be used for PDSCH as used for PDCCH. In a similar manner, the UE may be configured explicitly with RS for radio link monitoring (e.g., cell level failure monitoring). These signals may be referred to as RLM-RS. Any methods described herein or in general used for reference signals may be used for failure detection. A list of RLM-RS may or may not have correspondence to PDCCH and PDSCH beams. The methods described herein may be applied either separately for BFD-RS or RLM-RS or both at the same time.

When the UE 110 is not explicitly configured with a BFD-RS list, the UE determines the BFD-RS resources implicitly based on the configured/indicated/activated PDCCH-TCI states per CORESET, i.e., the downlink reference signals (CSI-RS, SS/PBCH block) that are spatially quasi-co-located (QCL'd) with PDCCH DMRS, or in other words, PDCCH beams or beams used for transmitting PDCCH. In a similar manner, the UE may determine the RS for radio link monitoring implicitly based on the TCI states for PDCCH. As for the BFD-RS, it is not excluded that implicit configuration can apply also based on PDSCH TCI state activation. The methods described herein may be applied for either separately for BFD-RS or RLM-RS, or for both. In general the methods can be applied for any signals used for failure detection I.b. TCI State and QCL Framework A common quasi-colocation (QCL) and Transmit Configuration Indication (TCI) framework is used for defining a "transmit beam" for different downlink physical signals and channels like for periodic, semi-persistent (S/P) and aperiodic CSI-RS, and NR-PDCCH and NR-PDSCH. For that, the UE 110 is configured with a TCI table in which each row (e.g., state) is associated with one or two RSs that act as a source RS or source RS(s) in terms of different QCL parameters (e.g., delay spread, average delay, Doppler spread, Doppler shift, spatial RX) for the certain downlink signal. When a spatial RX QCL parameter is configured for a certain source RS, the UE 110 can assume the same RX beam can be applied when receiving the configured/scheduled/triggered physical signal or physical channel as was used for receiving the source RS.

In the following, an overview of the PDCCH beam indication is provided. That is, the UE 110 can be configured (e.g., by the gNB 170) with up to three CORESETs and together 10 search space sets within a configured bandwidth part (BWP). A CORESET defines physical time and frequency resources on which NR-PDCCH can be transmitted. Search space set defines PDCCH monitoring related time domain parameters like monitoring periodicity. In other words, search space parameters provide the UE with information about when to try detecting NR-PDCCH from the certain CORESET.

For determining the transmit beam for the NR-PDCCH, it has been agreed that each CORESET may be associated to one or multiple of the above mentioned TCI rows (e.g., TCI states). In case the CORESET is associated with more than one TCI state, MAC-CE level activation signaling is used to control that which one of the multiple TCI states is active at a time per CORESET. Search space set related parameters associated to the CORESET define a time domain monitoring pattern from which the UE knows when to monitor a certain CORESET and then from associated (e.g., active) TCI state of the CORESET, the UE 110 knows how to set its RX beam.

Figures 2, 3:
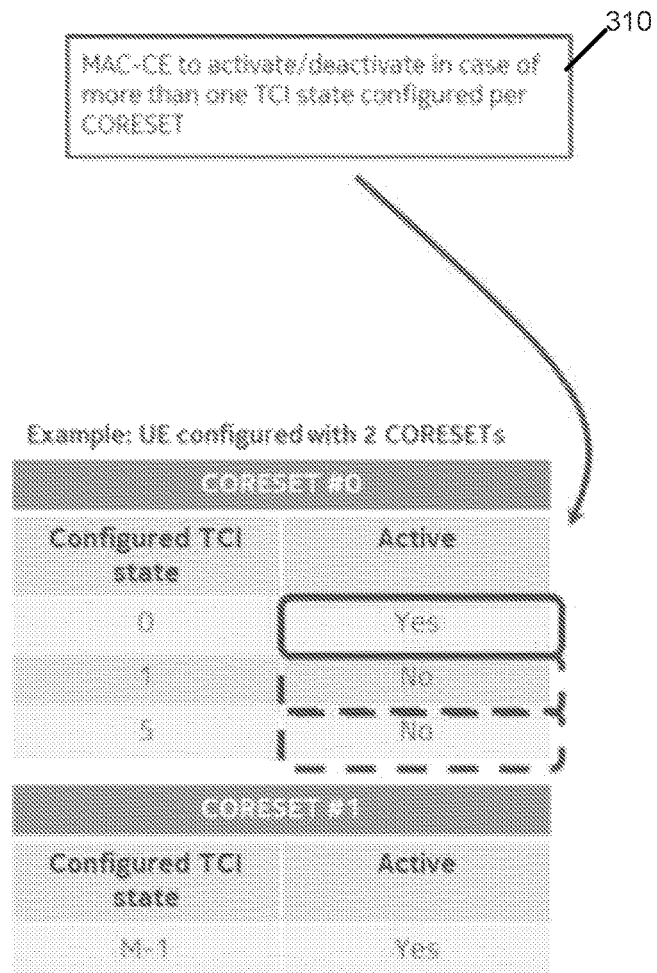
FIG. 2 is an example of a TCI table configured for a UE.
FIG. 3 illustrates two exemplary CORESET configurations showing association only to certain TCI state(s)

FIG. 2 provides an exemplary TCI table configured (e.g., by the gNB 170) for the UE, where QCL type A means Doppler spread, Doppler shift, delay spread, average delay, and QCL type D means spatial RX. There are four columns: TCI index; Source RS set; Source RS index; and QCL type. The TCI index is from 0 (zero) to M−1. The Source RS set includes RS set #A (for TCI index 0), RS set #B (for TCI index 1), . . . , and RS set #E (for TCI index M−1). The Source RS index includes the following: SS/PBCH block #n (of set #A) (for TCI index 0); both TRS #b (of set #B) and CSI-RS #c (of set #B) (for TCI index 1); . . . ; and CSI-RS #b (of set #E) (for TCI index M−1). The QCL type is the following: A+D (for TCI index 0); A for TRS #b and D for CSI-RS #c (for TCI index 1); . . . ; and A+D (for TCI index M−1).

Thus, when TCI index 0 determines source RS(s) for a certain physical signal or channel, the UE can determine that the UE can set its RX beam as this beam is set for receiving the SS/PBCH block #n. Correspondingly, when TCI index 1 determines source RS(s) for a certain physical signal or channel, the UE can determine that the UE can set its RX beam as this beam is set for receiving the CSI-RS #b (of RS set #B).

FIG. 3 illustrates a case where the UE has been configured with two CORESETs with one or multiple TCI state associations. For the CORESET #0, MAC-CE signaling is used to activate one TCI state at a time. See block 310, where a MAC-CE is used to activate/deactivate TCI states in case of more than one TCI state is configured per CORESET. The active configured TCI state in this example for CORESET #0 is state 0 (zero) (see "Yes" in the Active column), and states 1 and 5 are not active (see the "No" in the Active column). For CORESET #1, the configured TCI state is M−1 and is active (see the "Yes" in the Active column).

I.c. Current Resource Signal Operation

As an overview, the UE 110 may be configured explicitly or implicitly with a set of beam failure detection RS (BFD-RS), also referred to as a q0 set. In case of implicit configuration, the UE determines the q0 set based on activated PDCCH-TCI states (that is, downlink reference signals, i.e., CSI-RS or SS/PBCH block) per CORESET. The UE 110 may be configured with multiple CORESETs, and each CORESET may be associated with one or more PDCCH TCI states. In case of multiple TCI states per CORESET, only one TCI state per CORESET is active at a time (activated using MAC-CE signaling). It has been agreed that in 5G, the UE can be configured with three CORESETs: three different TCI states may be active at a time (unless two CORESETs have a common active TCI state), which means that three potential reference signals may be derived for beam failure detection. The maximum number of BFD-RS is agreed to be two. An issue therefore is how to select a subset of two BFD-RS out of three active TCI states (i.e., there needs to be a rule for the UE's selection which both the UE and the network are aware of). In general the issue can be formulated as how to select subset of failure detection resources from the set of resources.

In more detail, in NR, the UE can be configured with maximum of three CORESETs and each CORESET can be associated with TCI state for PDCCH. In RAN1 #92 the following agreement was made in the Chairman's Notes: Agreement (RRC parameter update): maxNrofFailureDetectionResources is 2 per BWP.

As the BFD-RS can be configured implicitly, i.e., the BFD-RS configuration (set of q0) follows the PDCCH-TCI-State indication, the above agreement of maximum of two BFD-RS resources creates a problem. The UE needs to be able to determine which of the set of BFD-RS the UE is actually monitoring for beam failure.

A straightforward solution would be to allow a maximum of three BFD-RS per BWP for the UE to prevent the above mentioned problem with implicit configuration. This is the approach that is being considered to be proposed, but alternative approaches described herein are likely to be needed. Having three BFD-RS per BWP was originally proposed in RAN1 #92, but such an approach was not selected by RAN1 as documented in the following: 3GPP TS 38.321 V15.1.0 (2018-03); and RAN1 Chairman's Notes: RAN1 #92. In addition, in RAN1 #92bis, there was concern on the number of RSs to be measured. As a consequence, in RAN1 #92bis, there was a limitation agreed upon for less than 3 GHz (<3 GHz) and greater than 6 GHz (>6 GHz) cases, so that the total number of configured BFD and RLM-RS resources are jointly limited, e.g., for <3 GHz instead 2 RLM-RS and 2 BFDs separately, in total a maximum of two resources can be configured (see RAN1 #92bis Chairman Minutes). If the number of the BFD would be changed, this would imply that the limited number, agreed as a working assumption, would need to be re-considered. Hence it seems rather unlikely that the extending of number of BFD-RS resources would be acceptable, and therefore alternative solutions are needed. Other approaches could be to restrict the number of maximum CORESET configurations to two, which would not be preferable, maybe even impossible, from a system operation perspective. In a more general view, although the maximum number of BFD-RS would be eventually increased, there may be still need for methods in this invention when the maximum number of BFD-RS is lower than the number of activated TCI-States for PDCCH.

Alternatively, when three PDCCH TCI states are configured for the UE, the network would need to explicitly select a maximum of two out of three TCI states to be the BFD-RS resources. This configuration is updated using RRC signaling (this is currently the only option), which is an intensive procedure in dynamic operation, i.e., when TCI state activations for PDCCH are relatively frequent. Furthermore, the TCI state activation can be performed using MAC-CE out of the RRC configured TCI state set, thus there would be potentially a mismatch between the activated TCI state and BFD-RS due to a signaling delay difference. Even in case of MAC CE used for activating BFD-RS from predetermined set, it would always require network to transmit the activation signal which requires transmission resources.

Currently, there is no limitation that, although the UE is configured with three CORESETs, two or more of the CORESETs need to have common TCI state, which would limit the BFD-RS to a maximum of two.

Thus, considering the above problematic scenario of using implicit BFD-RS configuration and the high signaling cost of explicit configuration of BFD-RS, we propose selection logic (e.g., based on rules) for selection of subset of BFD-RS when the number of TCI states due to the BFD-RS max value and PDCCH TCI state max value mismatch.

II. Exemplary Embodiments

In exemplary embodiments, we implement a mechanism for the UE to select N TCI states as a BFD-RS (set of q0) (or more generally for failure detection), when the UE is configured with M active TCI states for PDCCH and the maximum number of BFD-RS is N (N<M).

Figure 4:
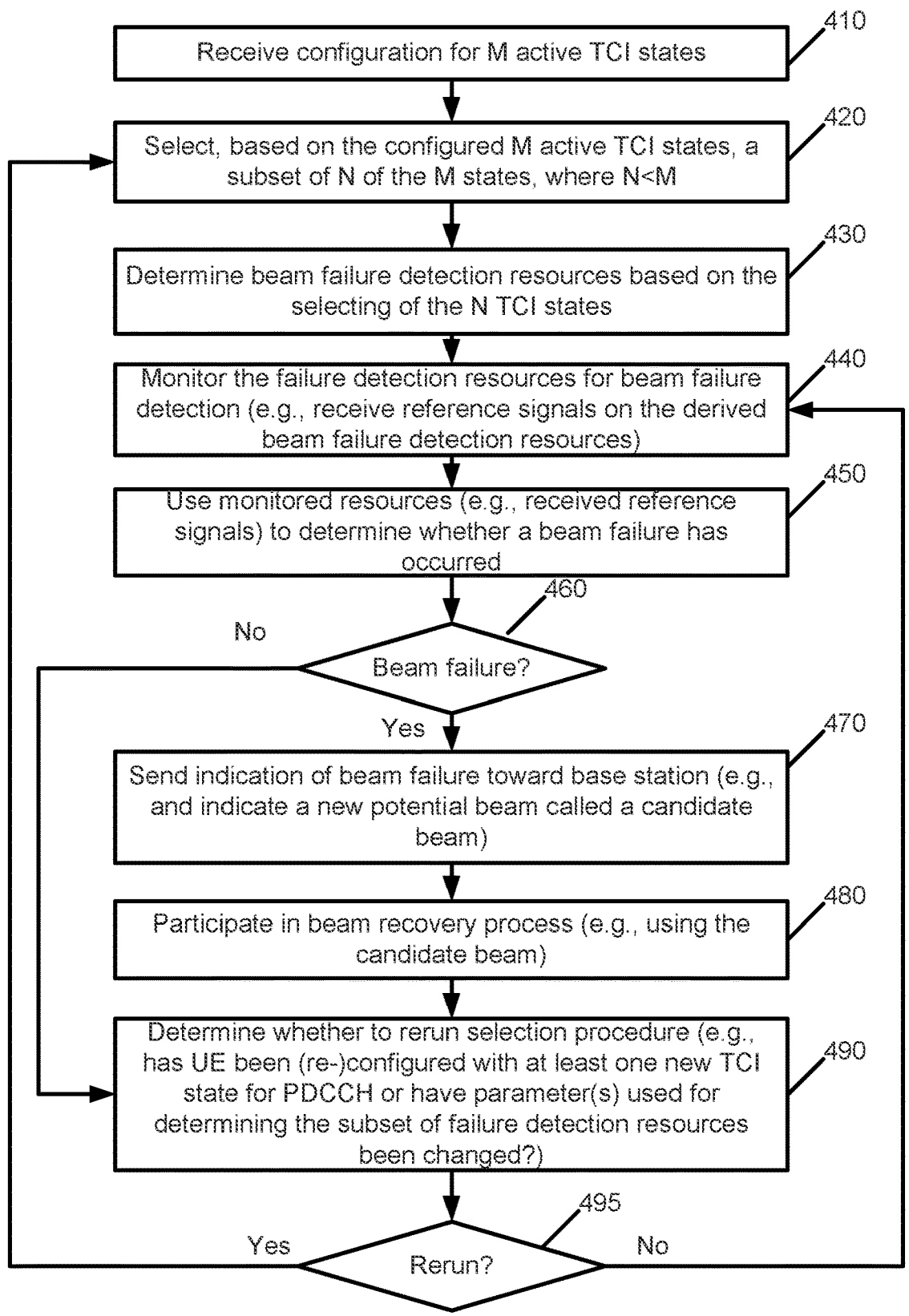
FIG. 4 is a logic flow diagram performed by a user equipment for selecting and using a subset of beam failure detection resources, in accordance with an exemplary embodiment.

Turning to FIG. 4, this figure is a logic flow diagram performed by a UE 110 for selecting and using a subset of beam failure detection resources, in accordance with an exemplary embodiment. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the beam failure module 140 may include multiples ones of the blocks in FIG. 4, where each included block is an interconnected means for performing the function in the block. The blocks in FIG. 4 are assumed to be performed by the UE 110, e.g., under control of the beam failure module 140 at least in part.

In block 410, the UE 110 receives configuration, e.g., from the gNB 170, for M active TCI states. The UE 110 selects, in block 420 and based on the configured M active TCI states, a subset of N of the M states, where N<M. This selection is based on one or more rules described in FIG. 6. In block 430, the UE 110 determines beam failure detection resources based on the selecting N TCI states. The UE 110 in block 440 monitors the failure detection resources for beam failure detection. This may entail receiving reference signals on the determined beam failure detection resources. In block 450, the UE 110 uses the monitored failure detection resources (e.g., the received reference signals on the monitored failure detection resources) to determine whether a beam failure has occurred. If a beam failure has not occurred (block 460=No), the flow proceeds to block 490. On the other hand, if a beam failure has occurred (block 460=Yes), in block 470, the UE 110 sends an indication of the beam failure toward the base station (e.g., the gNB 170). The UE 110 may indicate a new potential beam called a candidate beam. In block 480, the UE 110 participates (e.g., with the gNB 170) in a beam recovery process, e.g., using the candidate beam. In this case as an example, the UE may indicate as a new candidate beam the TCI state (SSB or CSI-RS) that was not used as BFD-RS due to the selection of subset of BFD-RS earlier. The TCI state that was not used for failure detection may also have uplink resources (e.g., PUCCH) that can be used to indicate the beam failure. Beam recovery is specified by 3GPP in specifications 3GPP TS 38.213 and 3GPP TS 38.321. One option (as shown in FIG. 4) is that block 480 could go to block 490 (described below), since the recovery procedure ends when the UE receives a new TCI state from the network.

It is also possible for the UE 110 to be (re-)configured with at least one new TCI-state for PDCCH. In this case, the selection logic procedure is re-run at UE. Alternatively, if any of the parameter(s) used for determining the subset of failure detection resources is/are changed, the selection logic procedure is rerun.

In the example of FIG. 4, this is implemented as follows. In block 490, the UE 110 determines whether to rerun the selection procedure (e.g., has the UE been (re-)configured with at least one new TCI state for PDCCH, or have parameter(s) used for determining subset of failure detection resources been changed?). If a determination is made not to rerun the selection procedure (block 495=No), the flow proceeds to block 440. If a determination is made to rerun the selection procedure (block 495=Yes), the flow proceeds to block 420. The selection in block 420 would be based on the (re-)configured at least one new TCI state for PDCCH, or on the changed parameter(s) (e.g., and possibly other unchanged parameters) used for determining subset of failure detection resources.

Figure 5:
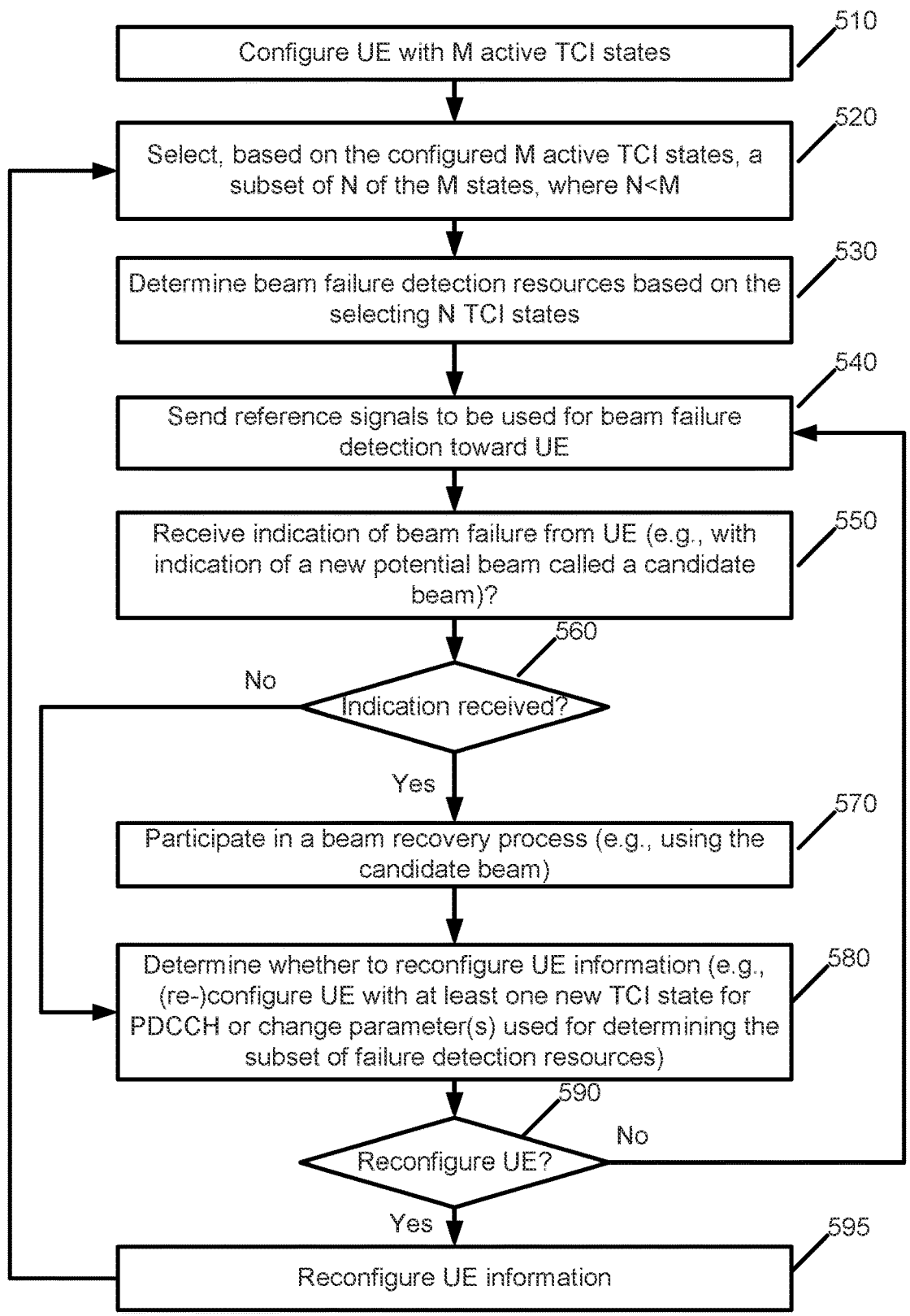
FIG. 5 is a logic flow diagram performed by a base station for selecting and using a subset of beam failure detection resources, in accordance with an exemplary embodiment.

Referring to FIG. 5, this figure is a logic flow diagram performed by a base station for selecting and using a subset of beam failure detection resources, in accordance with an exemplary embodiment. This figure further illustrates the operation of an exemplary method or methods, a result of execution of computer program instructions embodied on a computer readable memory, functions performed by logic implemented in hardware, and/or interconnected means for performing functions in accordance with exemplary embodiments. For instance, the beam failure module 150 may include multiples ones of the blocks in FIG. 5, where each included block is an interconnected means for performing the function in the block. The blocks in FIG. 5 are assumed to be performed by a base station such as gNB 170, e.g., under control of the beam failure module 150 at least in part.

In block 510, the gNB 170 configures the UE 110 with M active TCI states. In block 520, the gNB 170 selects, based on the configured M active TCI states, a subset of N of the M states, where N<M. This selection may be based on the rules described in FIG. 6. The gNB 170 in block 530 determines beam failure detection resources based on the selecting N TCI states, and in block 540 sends reference signals (e.g., on beam failure detection resources) to be used for beam failure detection toward the UE. In block 550, the gNB 170 determines whether an indication of beam failure has been received from the UE. This may also include an indication of a new potential beam called a candidate beam. If not (block 560=No), the flow proceeds to block 580. If so (block 560=Yes), the gNB 170 in block 570 participates (e.g., with the UE 110) in a beam recovery process, e.g., using the candidate beam. Beam recovery is specified by 3GPP in specifications 3GPP TS 38.213 and 3GPP TS 38.321. One option (as shown in FIG. 5) is that block 570 could go to block 580 (described below), since the recovery procedure ends when the gNB 170 sends a new TCI state to the UE 110.

As described above, it is also possible for the network to (re-)configure the UE 110 with at least one new TCI-state for PDCCH. In this case, the selection logic procedure is re-run at the network (e.g., and at the UE). Alternatively, if any of the parameter(s) used for determining the subset of failure detection resources is/are changed, the selection logic procedure is rerun.

With respect to the example of FIG. 5, this is implemented as follows. In block 580, the gNB 170 determines whether to reconfigure UE information (e.g., (re-)configure the UE 110 with at least one new TCI-state for PDCCH, or change parameter(s) used for determining the subset of failure detection resources). If a determination is made not to reconfigure the UE information (block 590=No), the flow proceeds to block 540. If a determination is made to reconfigure the UE information (block 590=Yes), the flow proceeds to block 595, where the gNB 170 reconfigures the UE information. This would involve one or both of (re-)configuring at least one new TCI-state for PDCCH, or changing one or more parameters used for determining subset of failure detection resources. The flow then proceeds to block 520.

Figure 6:
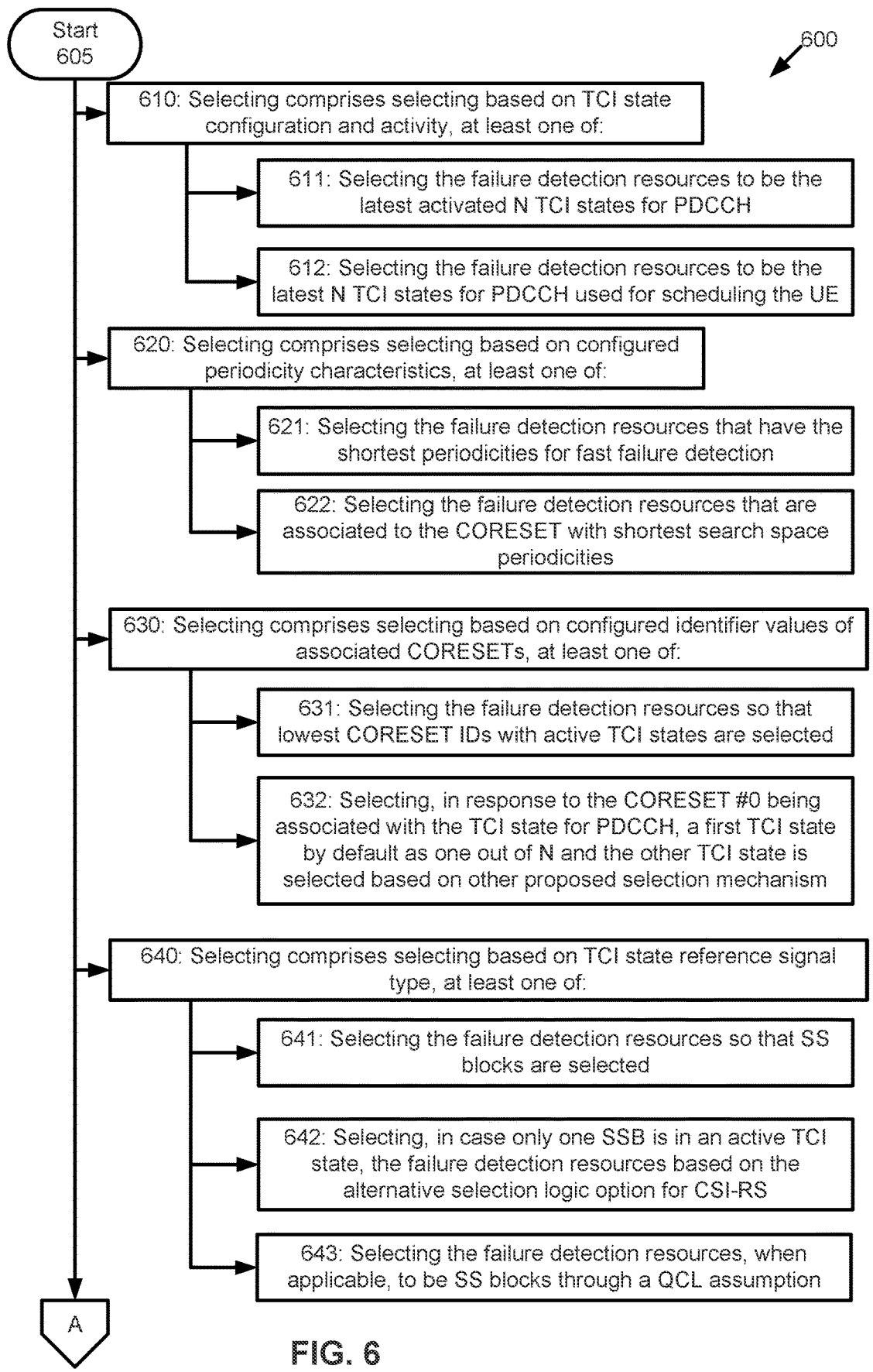
FIG. 6 is a logic flow diagram of a process of selecting, based on configured M active TCI states, a subset of N of the M states, where N<M, in accordance with exemplary embodiments.
Figure 6:
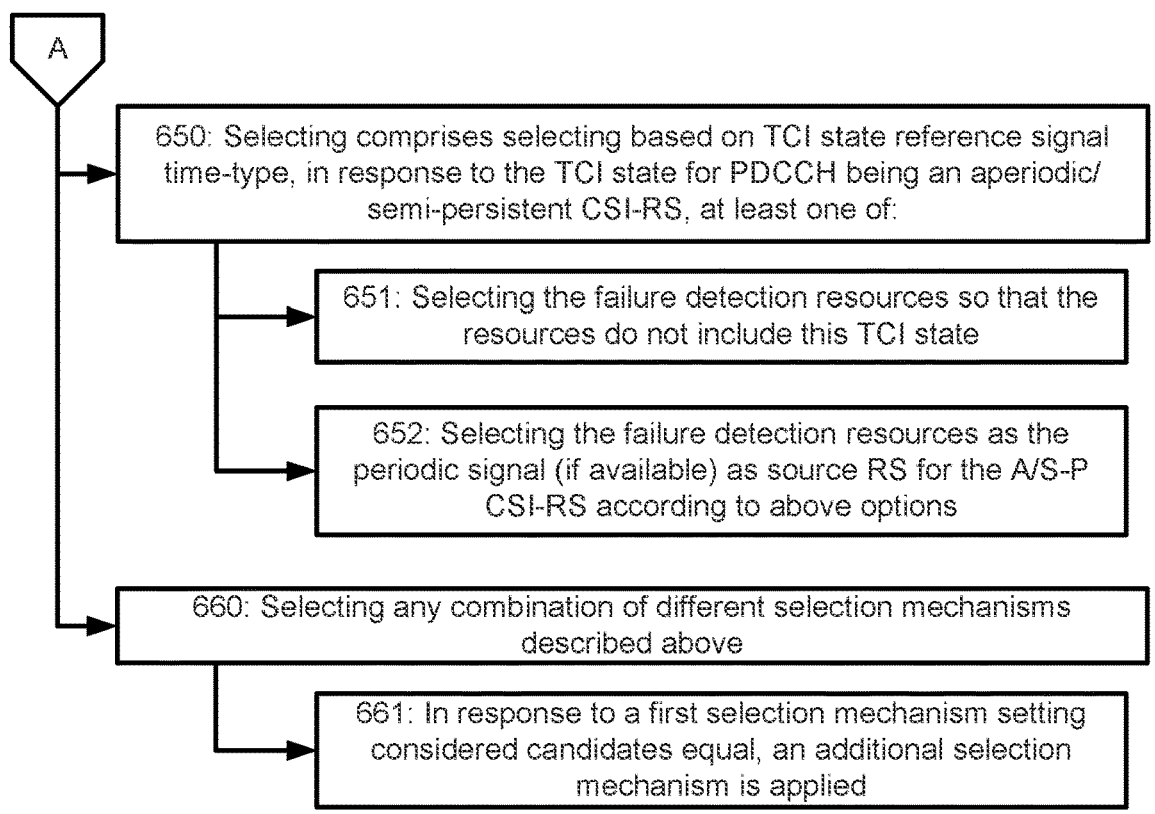

In order to select the same N TCI states, both the network (e.g., gNB 170) and the UE 110 should follow the same selection process. FIG. 6 is a logic flow diagram of a process 500 of selecting, based on configured M active TCI states, a subset of N of the M states, where N<M, in accordance with exemplary embodiments. This process may be performed by the UE 110 in block 420 or by the gNB 170 (or possibly another network element such as the NCE 190) in block 520. This figure further illustrates the operation of an exemplary method or methods, a result of execution of computer program instructions embodied on a computer readable memory, functions performed by logic implemented in hardware, and/or interconnected means for performing functions in accordance with exemplary embodiments.

Illustratively, the process 600 may be considered to be a method for the selecting of N TCI states for PDCCH (e.g., CSI-RS/SSB) to be included in the resource set used for determining beam failure when the number of M TCI states for PDCCH is configured, where value N is smaller than M (N<M). There are multiple approaches in process 600, each using a rule described below. One main and exemplary benefit (or technical effect) of each of the selected approaches is that the network and UE have the same understanding that which signals are used for failure detection, when all cannot be used. The individual rules in the blocks of FIG. 6 have their benefits (or technical effects) and depending on the individual benefits listed below (e.g., do we want simplicity or fast failure detection or based on most robust signals?) one rule may be preferred over another.

The process 600 starts in block 605. In one example, the selecting comprises selection based on TCI state configuration and activity (see block 610), for at least one of the following:

Selecting (block 611) the failure detection resources to be the latest activated N TCI states for PDCCH; or Selecting (block 612) the failure detection resources to be the latest N TCI states for PDCCH used for scheduling the UE (e.g., this would prefer the most active beams).

A benefit or technical effect of block 611 is to keep the NW and UE with a same understanding of which signals are used for failure detection, i.e., the NW knows the link or links that are monitored by UE (and which is not). Thus, the NW may rely on the recovery actions of the UE side. It may be possible, for instance, to determine that in this case UE can initiate a beam failure recovery procedure when the currently used signals are in a failure condition. This is also a simple selection rule for UE to process.

A benefit or technique effect of the approach of block 612 is that this approach prefers the beams based on scheduling activity, i.e., if the most active beams are in a failure condition, the UE reacts on those faster. This may not be covered by the first approach in block 611.

Alternatively, the selecting comprises selection based on configured periodicity characteristics (see block 620), for at least one of the following:

Selecting (block 621) the failure detection resources that have the shortest periodicities for fast failure detection; or Selecting (block 622) the failure detection resources that are associated to the CORESET with the shortest search space periodicities.

With respect to blocks 620, 621, and 622, benefits or technical effects include the following. If the beam failure detection (and indication) periodicity is based on periodicity of the reference signals, the failure could be detected in a quick manner. Also, the UE 110 may have the better availability for measurements. In some cases when multiple signals are transmitted in parallel, e.g., PDSCH, SS block, CSI-RS for L3 mobility, a RLM-RS UE would need to skip measurements sometimes. Short periodicity means that the signals are available for measurements more often.

Also, the shortest periodicity for search space means that UE monitors those links more often, thus they may be considered to be more important for scheduling. It is beneficial to detect failure on those links.

Alternatively, the selecting comprises selection based on configured identifier values of associated CORESETs (see block 630), for at least one of the following:

Selecting (block 631) the failure detection resources so that lowest CORESET IDs with active TCI states are selected; or Selecting (block 632), in response to the CORESET #0 being associated with the TCI state for PDCCH, a first TCI state by default as one out of N and the other TCI state is selected based on another proposed selection mechanism (e.g., as shown in any of blocks 610, 620, 640, or 650 of FIG. 6).

Benefits or technical effects of blocks 630, 631, and 632 include the following. The selection rule is simple. Also, selecting at least CORESET #0 means that the UE is performing failure detection of a robust CORESET since this is used for initial access-/contention-based RACH.

Alternatively, the selecting comprises selection based on TCI state reference signal type (see block 640), for at least one of the following:

Selecting (block 641) the failure detection resources so that SS blocks are selected, i.e., in response to the UE 100 having N SSBs as active TCI states and M−N CSI-RS as active TCI states, the SS blocks are selected;

Selecting (block 642), in case only one SSB is in an active TCI state, the failure detection resources based on the alternative selection logic option for CSI-RS (i.e., in response to the UE 100 having one SSB as an active TCI state and M−1 CSI-RS as active TCI states, one out of the two (or M−1) CSI-RS is selected); or Selecting (block 643) the failure detection resources, when applicable, to be SS blocks through a QCL assumption, where, e.g., in response to three CSI-RS being configured and only two different SS blocks being configured as source RS for the CSI-RS, the SS blocks are selected. When signals share the same QCL assumption between each other, it means they share the same indicted property such as delay spread, Doppler spread, Doppler shift, average delay, and/or spatial reception parameters. As an example, when signals have the spatial RX QCL assumption, it would mean that UE can assume a same RX beam when receiving the signals.

Figure 7:
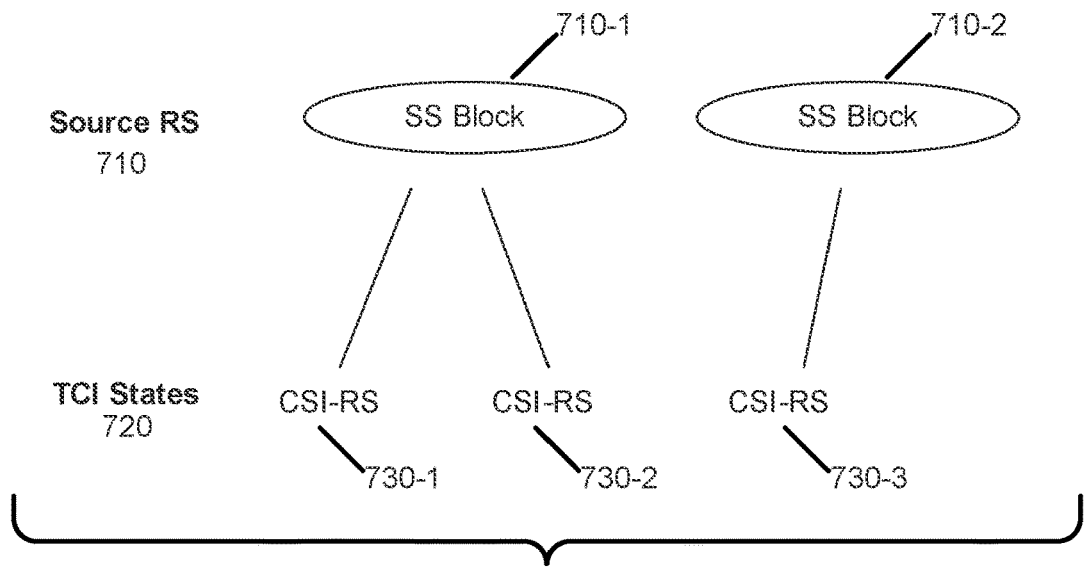
FIG. 7 is an illustration of three TCI states with two source RSs.

Referring to FIG. 7, this figure is an illustration of three TCI states (CSI-RS) 720 with only two different source RSs 710. The source may mean a QCL source for the CSI-RS, i.e., in the figure two CSI-RS share the same QCL source, thus they share, e.g., the spatial QCL assumption. That is, the SS block 710-1 corresponds to the TCI states 710 of the CSI-RS 730-1 and 730-2. The SS block 710-1 corresponds to the TCI state 720 of CSI-RS 730-3.

Turning back to FIG. 6, a main benefit for blocks 640-643 is that when SSBs are selected, the UE is potentially performing beam failure detection on robust signals. Typically, the SS block beams are wider than high gain CSI-RS beams (e.g., and wider provides better spatial coverage).

Alternatively, selecting (see block 650) comprises selection based on TCI state reference signal time-type, in response to the TCI state for PDCCH being an aperiodic/semi-persistent CSI-RS, for at least one of the following:

Selecting (block 651) the failure detection resources so that the resources do not include this TCI state; or Selecting (block 652) the failure detection resources as the periodic signal (if available) as source RS for the A/S-P (aperiodic/Semi-Persistent) CSI-RS according to the above options (e.g., any of the above steps 610, 620, 630, or 640).

With respect to blocks 650-652, selecting an aperiodic signal may not be beneficial for failure detection since by definition the signal is not periodic and the UE would need to have the periodic signals for performing measurements. It would be best to use the periodic source signal, or then exclude the aperiodic signal from failure detection RS set.

The process 600 may also include (block 660) selecting any combination of different selection mechanisms described above, e.g., in blocks 610-652. For instance, in block 661, in response to a first selection mechanism setting considered candidates (e.g., of the rules in blocks 610, 620, 630, 640, and 650) equal, an additional selection mechanism is applied. That is, if we reach with one method the equal candidates, and are still not down to N candidates, we need to use additional method(s) as described herein to select the final candidate.

The above description concerned an implicit method, where the UE runs the specified algorithms to determine BFD resources. The network does not indicate these resources because the UE can determine these itself. On the network side, there are two aspects that can be addressed:

1) Implicit operation, which is the counterpart of the UE operation in FIG. 4, and is illustrated in FIG. 5. That is, the network (e.g., the gNB 170) runs the same algorithms to know which resources the UE will be using for BFD.

2) Explicit operation, where the network runs the specified algorithms (e.g., perhaps in combination with something else) to determine which resources are to be used by UE for BFD and indicates these resources to the UE. The UE then does not run those algorithms on its side, since the UE 110 gets an explicit indication from the network.

Figure 8:
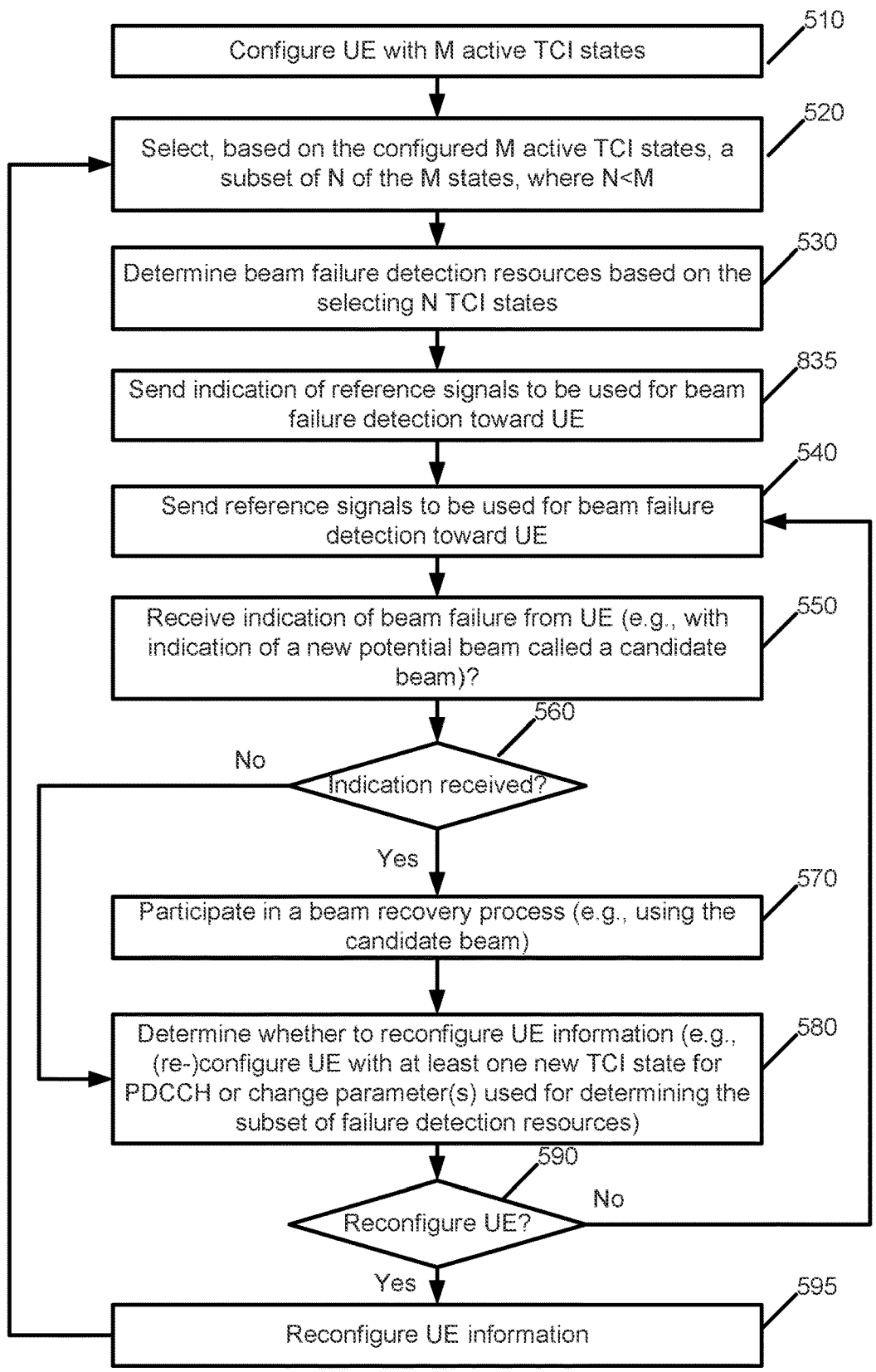
FIG. 8 is a logic flow diagram performed by a base station for selecting and using a subset of beam failure detection resources that is similar to FIG. 5 but uses explicit operation instead of the implicit operation in FIG. 5, in accordance with an exemplary embodiment.

The explicit operation of (2) is illustrated by FIG. 8, which is a logic flow diagram performed by a base station for selecting and using a subset of beam failure detection resources that is similar to FIG. 5 but uses explicit operation instead of the implicit operation in FIG. 5, in accordance with an exemplary embodiment. The blocks in FIG. 8 are assumed to be performed by a base station such as gNB 170, e.g., under control of the beam failure module 150 at least in part. Since FIG. 8 is similar to FIG. 5, only the differences are described herein.

To implement explicit operation, the gNB 170 first determines the beam failure detection resources to be used by the UE 100 based on the selecting N TCI states. Then, in block 835, the gNB 170 sends indication of the reference signals (e.g., the beam failure detection resources) to be used for beam failure detection toward the UE 110. This explicit signaling explicitly configures the UE 110 to use those reference signals for beam failure detection. The other parts of the method in FIG. 8 are the same as those in FIG. 5.

It is noted that a partial beam failure (less than N resources) may occur. In response to the partial beam failure occurring and one of the failure detection resources is in a failure condition, the RS in the failure condition may be removed from the failure detection resource set of q0 and the remaining N−1 downlink RSs are used as the failure detection resources instead. Furthermore, if N−1 resources (i.e., all but one of the resources) are in a failure condition, and the RS not in failure condition was not included in the failure detection resource set of q0, the said RS is added to set of q0 (and also used for beam failure detection). Alternatively, in case of partial beam failure, the failure detection resource set is maintained as is.

In one network side implementation option, the gNB 170 may use similar logic for selecting explicitly configured the failure detection resources (N out of M) for UE for beam failure detection, when applicable.

In one implementation option, the network may configure the UE to limit the value N to a specific value. For instance, when M=5, the network may configure N=3. The UE applies the selection logic for N downlink RSs as described above.

Some of the proposed rules may be potentially used also at the network side to select the failure detection resources in case N<M and explicit configuration is used. The network may use similar methods described herein.

With respect to implementation of these embodiments via technical specifications, the following is an exemplary text proposal for 3GPP TS 38.213, Link Reconfiguration, Chapter 6:

If the number of RS indexes in the RS sets indicated by TCI states for PDCCH exceeds the maxNrofFailureDetectionResources (Nmax), the UE determines to include the SS/PBCH Block and periodic CSI-RS index values to the set $\bar{q}_0$ according to the order of TCI state indication so that the last Nmax indicated states are included. If equal priority is determined for Nmax TCI states, the set of q0 is determined to include the RS of the last Nmax TCI states for PDCCH monitoring that the UE has successfully decoded using C-RNTI, i.e., include the Nmax latest states that were used to schedule the UE. In one example, the UE determines the set of q0 always based on last Nmax TCI states for PDCCH monitoring that UE has successfully decoded using C-RNTI (or in other words links that were used to schedule the UE most recently in a UE-specific manner).

In a more general view, although the maximum number of BFD-RS would be eventually increased there may still be a need for methods in this invention when the maximum number of BFD-RS is lower than the number of activated TCI-States for PDCCH. In one example, such case may occur when multiple TRPs (transmission-reception points) are used simultaneously to transmit PDCCH to the UE and each link is associated with own CSI-RS. In one way, the UE could be indicated using the same TCI framework that, e.g., 2 TCI states are active for PDCCH reception, which would mean that UE is served with two links simultaneously. In this case, the UE may need to have capability to receive from two directions (e.g. from two TRPs) at the same time using two beams (formed by, e.g., different antenna panels). Alternatively, the UE may have an omnidirectional beam and the UE would be able to receive from all the directions at the same time. Thus, the UE may, based on implicit configuration, receive multiple PDCCH on multiple links and thus monitor, per each link per CORESET, the failure condition. In this case, in an example, the UE may need to select the failure detection resource per CORESET (using methods in the description herein) or select the BFD-RS across all the TCI states of all configured CORESETs. In this case, it may be determined that the UE needs to include at least one BFD-RS per CORESET for failure detection.

Additional exemplary embodiments are as follows.

Example 1

A method, comprising:
receiving at a user equipment configuration for M active transmission configuration indication states;
selecting, according to one or more pre-defined rules, based on the configured M active transmission configuration indication states, a subset of N of the set of M transmission configuration indication states, where N<M; and
determining by the user equipment beam failure detection resources based on the selected N transmission configuration indication states.

Example 2

The method of example 1, further comprising monitoring the failure detection resources for beam failure detection.

Example 3

The method of example 2, further comprising:
determining based on the monitored failure detection resources that a beam failure has occurred;
sending an indication of beam failure toward a base station; and
participating in a beam recovery process with the base station.

Example 4

A method, comprising:
configuring by a base station a user equipment with configuration for M active transmission configuration indication states;
selecting, based on the configured M active transmission configuration indication states a subset of N of the M transmission configuration indication states, where N<M;
determining by the base station beam failure detection resources based on the selecting N transmission configuration indication states.

Example 5

The method of example 4, further comprising transmitting, by the base station and toward the user equipment, an indication of reference signals to be utilized by the user equipment as beam failure detection resources.

Example 6

The method of any of examples 4 to 5, further comprising:
receiving from the user equipment an indication of beam failure; and participating in a beam recovery process with the user equipment.

Example 7

The method of any of examples 1 to 6, wherein the M active transmission configuration indication states are for a physical downlink control channel.

Example 8

The method of any of examples 1 to 7, wherein the selecting a subset of N of the M transmission configuration indication states comprises selection based on TCI state configuration and/or activity and comprises at least one of the following:
  selecting the failure detection resources to be a latest activated TCI states for PDCCH; or
  selecting the failure detection resources to be latest TCI states for PDCCH used for scheduling the user equipment.

Example 9

The method of any of examples 1 to 8, wherein the selecting a subset of N of the M transmission configuration indication states comprises selection based on configured periodicity characteristics and comprises at least one of the following:
  selecting the failure detection resources that have shortest periodicities for fast failure detection; or
  selecting the failure detection resources that are associated to a CORESET with shortest search space periodicities.

Example 10

The method of any of examples 1 to 9, wherein the selecting a subset of N of the M transmission configuration indication states comprises selection based on configured identifier values of associated CORESETs and comprises at least one of the following:
  selecting the failure detection resources so that lowest CORESET IDs with active TCI states are selected; or
  selecting, in response to CORESET #0 being associated with a TCI state for PDCCH, a first TCI state by default as one out of N TCI states and at least one other TCI state is selected based on an other proposed selection mechanism in the method of example 1 or 4 any example dependent on example 1 or 4 except for this example.

Example 11

The method of any of examples 1 to 10, wherein the selecting a subset of N of the M transmission configuration indication states comprises selection based on TCI state reference signal type and comprises at least one of the following:
  selecting the failure detection resources so that SS blocks are selected;
  selecting, in case only one SSB is in an active TCI state, the failure detection resources based on an alternative selection logic option for CSI-RS; or
  selecting the failure detection resources, when applicable, to be SS blocks through a QCL assumption.

Example 12

The method of any of examples 1 to 11, wherein the selecting a subset of N of the M transmission configuration indication states comprises selection based on TCI state reference signal time-type, in response to a TCI state for PDCCH being an aperiodic/semi-persistent CSI-RS, and comprises at least one of the following:
  selecting the failure detection resources so that the failure detection resources do not include this TCI state; or
  selecting the failure detection resources as the periodic signal, if available, as a source RS for the A/S-P CSI-RS according to the method of example 1 or 4 or any example dependent on example 1 or 4 except for this example.

Example 13

The method further comprising selecting any combination of different selection mechanisms of any of examples 1 to 12.

Example 14

The method of any of examples 1 to 13, wherein in response to a partial beam failure occurring and one of the failure detection resources is in a failure condition, removing the reference signal in the failure condition from the N transmission configuration indication states and using the remaining N−1 transmission configuration indication states as the failure detection resources instead.

Example 15

The method of example 14, in response to N−1 resources being in a failure condition and a reference signal not in failure condition was not included in the N transmission configuration indication states, adding the reference signal not in the failure condition to the N transmission configuration indication states and using the added reference signal for the beam failure detection.

Example 16

A computer program comprising program code for executing the method according to any of examples 1 to 15.

Example 17

The computer program according to example 16, wherein the computer program is a computer program product comprising a computer-readable medium bearing computer program code embodied therein for use with a computer.

Example 18

A computer program product comprising a computer-readable storage medium bearing computer program code embodied therein for use with a computer, the computer program code comprising code for performing the method according to any of examples 1 to 15.

Example 19

An apparatus, comprising:
  means for receiving at a user equipment configuration for M active transmission configuration indication states;
  means for selecting, according to one or more pre-defined rules, based on the configured M active transmission configuration indication states, a subset of N of the set of M transmission configuration indication states, where N<M; and means for determining by the user equipment beam failure detection resources based on the selected N transmission configuration indication states.

Example 20

The apparatus of example 19, further comprising means for monitoring the failure detection resources for beam failure detection.

Example 21

The apparatus of example 20, further comprising:
means for determining based on the monitored failure detection resources that a beam failure has occurred;
means for sending an indication of beam failure toward a base station; and
means for participating in a beam recovery process with the base station.

Example 22

An apparatus, comprising:
means for configuring by a base station a user equipment with configuration for M active transmission configuration indication states;
means for selecting, based on the configured M active transmission configuration indication states a subset of N of the M transmission configuration indication states, where N<M;
means for determining by the base station beam failure detection resources based on the selecting N transmission configuration indication states.

Example 23

The apparatus of example 22, further comprising means for transmitting, by the base station and toward the user equipment, an indication of reference signals to be utilized by the user equipment as beam failure detection resources.

Example 24

The apparatus of any of examples 22 to 23, further comprising:
means for receiving from the user equipment an indication of beam failure; and
means for participating in a beam recovery process with the user equipment.

Example 25

The apparatus of any of examples 22 to 24, wherein the M active transmission configuration indication states are for a physical downlink control channel.

Example 26

The apparatus of any of examples 22 to 25, wherein the selecting a subset of N of the M transmission configuration indication states comprises selection based on TCI state configuration and/or activity and comprises at least one of the following:
selecting the failure detection resources to be a latest activated TCI states for PDCCH; or
selecting the failure detection resources to be latest TCI states for PDCCH used for scheduling the user equipment.

Example 27

The apparatus of any of examples 22 to 26, wherein the selecting a subset of N of the M transmission configuration indication states comprises selection based on configured periodicity characteristics and comprises at least one of the following:
selecting the failure detection resources that have shortest periodicities for fast failure detection; or
selecting the failure detection resources that are associated to a CORESET with shortest search space periodicities.

Example 28

The apparatus of any of examples 22 to 27, wherein the selecting a subset of N of the M transmission configuration indication states comprises selection based on configured identifier values of associated CORESETs and comprises at least one of the following:
selecting the failure detection resources so that lowest CORESET IDs with active TCI states are selected; or
selecting, in response to CORESET #0 being associated with a TCI state for PDCCH, a first TCI state by default as one out of N TCI states and at least one other TCI state is selected based on an other proposed selection mechanism in the apparatus of example 19 or 22 or any example dependent on example 19 or 22 except for this example.

Example 29

The apparatus of any of examples 22 to 28, wherein the selecting a subset of N of the M transmission configuration indication states comprises selection based on TCI state reference signal type and comprises at least one of the following:
selecting the failure detection resources so that SS blocks are selected;
selecting, in case only one SSB is in an active TCI state, the failure detection resources based on an alternative selection logic option for CSI-RS; or
selecting the failure detection resources, when applicable, to be SS blocks through a QCL assumption.

Example 30

The apparatus of any of examples 22 to 29, wherein the selecting a subset of N of the M transmission configuration indication states comprises selection based on TCI state reference signal time-type, in response to a TCI state for PDCCH being an aperiodic/semi-persistent CSI-RS, and comprises at least one of the following:
selecting the failure detection resources so that the failure detection resources do not include this TCI state; or
selecting the failure detection resources as the periodic signal, if available, as a source RS for the A/S-P CSI-RS according to the an other proposed selection mechanism in the apparatus of example 19 or 22 or any example dependent on example 19 or 22 except for this example.

Example 31

The apparatus further comprising selecting any combination of different selection mechanisms of any of examples 22 to 30.

Example 32

The apparatus of any of examples 22 to 31, wherein in response to a partial beam failure occurring and one of the failure detection resources is in a failure condition, removing the reference signal in the failure condition from the N transmission configuration indication states and using the remaining N−1 transmission configuration indication states as the failure detection resources instead.

Example 33

The apparatus of example 32, in response to N−1 resources being in a failure condition and a reference signal not in failure condition was not included in the N transmission configuration indication states, adding the reference signal not in the failure condition to the N transmission configuration indication states and using the added reference signal for the beam failure detection.

Example 34

A user equipment comprising the apparatus of any of examples 19 to 21 or examples 25 to 33.

Example 35

A base station comprising the apparatus of any of examples 22 to 33.

Example 36

An apparatus, comprising:
one or more processors; and
one or more memories including computer program code,
the one or more memories and the computer program code configured, with the one or more processors, to cause the apparatus to perform at least the following:
receiving at a user equipment configuration for M active transmission configuration indication states;
selecting, according to one or more pre-defined rules, based on the configured M active transmission configuration indication states, a subset of N of the set of M transmission configuration indication states, where N<M; and
determining by the user equipment beam failure detection resources based on the selected N transmission configuration indication states.

Example 37

The apparatus of example 36, wherein the one or more memories and the computer program code are configured, with the one or more processors, to cause the apparatus to perform a method according to any of examples 2 or 3 or 7 to 15.

Example 38

An apparatus, comprising:
one or more processors; and
one or more memories including computer program code,
the one or more memories and the computer program code configured, with the one or more processors, to cause the apparatus to perform at least the following:
configuring by a base station a user equipment with configuration for M active transmission configuration indication states;
selecting, based on the configured M active transmission configuration indication states a subset of N of the M transmission configuration indication states, where N<M;
determining by the base station beam failure detection resources based on the selecting N transmission configuration indication states.

Example 39

The apparatus of example 38, wherein the one or more memories and the computer program code are configured, with the one or more processors, to cause the apparatus to perform a method according to any of examples 5 to 15.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The invention claimed is:

1. A method, comprising:
receiving at a user equipment configuration for M active transmission configuration indication states;
selecting, by the user equipment according to one or more pre-defined rules, based on the configured M active transmission configuration indication states, a subset of N of the set of M transmission configuration indication states, where N<M; and
determining by the user equipment failure detection resources based on the selected N transmission configuration indication states.

2. The method of claim 1, wherein the failure detection resources comprise at least one of beam failure detection reference signal resources or radio link monitoring reference signal resources.

3. The method of claim 1, wherein the selecting the subset of N of the M transmission configuration indication states comprises selection based on configured periodicity characteristics and comprises at least one of the following:

selecting the failure detection resources that have shortest periodicities for fast failure detection; or selecting the failure detection resources that are associated to a control resource set with shortest search space periodicities.

4. An apparatus, comprising:
one or more processors; and
one or more memories including computer program code, the one or more memories and the computer program code configured, with the one or more processors, to cause the apparatus at least to:
receive, at a user equipment, configuration for M active transmission configuration indication states;
select, according to one or more pre-defined rules, based on the configured M active transmission configuration indication states, a subset of N of the set of M transmission configuration indication states, where N<M; and
determine, by the user equipment, failure detection resources based on the selected N transmission configuration indication states.

5. The apparatus of claim 4, wherein the failure detection resources comprise at least one of beam failure detection reference signal resources or radio link monitoring reference signal resources.

6. The apparatus of claim 4, wherein the selecting the subset of N of the M transmission configuration indication states comprises selection based on configured periodicity characteristics and comprises at least one of the following:
selecting the failure detection resources that have shortest periodicities for fast failure detection; or
selecting the failure detection resources that are associated to a control resource set with shortest search space periodicities.

7. The apparatus of claim 4, wherein the selecting the subset of N of the M transmission configuration indication states comprises selection based on transmission configuration indication (TCI) state configuration, activity, or both TCI state configuration and activity and comprises at least one of the following:
selecting the failure detection resources to be a latest activated TCI states for a physical downlink control channel (PDCCH); or
selecting the failure detection resources to be latest TCI states for a PDCCH used for scheduling the user equipment.

8. The apparatus of claim 4, wherein the selecting the subset of N of the M transmission configuration indication states comprises selection based on configured identifier values of associated control resource sets and comprises
selecting the failure detection resources so that lowest control resource set identifiers with active transmission configuration indication states are selected.

9. The apparatus of claim 4, wherein the selecting the subset of N of the M transmission configuration indication states comprises selection based on transmission configuration indication state reference signal type and comprises at least one of the following:

selecting the failure detection resources so that synchronization signal blocks (SSB)s are selected;

selecting, in case only one SSB is in an active transmission configuration indication state, the failure detection resources based on an alternative selection logic option for channel state information reference signal; or selecting the failure detection resources, when applicable, to be SSBs through a quasi colocation assumption.

10. The apparatus of claim 4, wherein the selecting the subset of N of the M transmission configuration indication states comprises selection based on transmission configuration indication (TCI) state reference signal time-type, in response to a TCI state for a physical downlink control channel being an aperiodic/semi-persistent channel state information reference signal, and comprises
selecting the failure detection resources so that the failure detection resources do not include this TCI state.

11. The apparatus of claim 4, wherein the M active transmission configuration indication states are for a physical downlink control channel.

12. The apparatus of claim 4, wherein the one or more memories and the computer program code are further configured, with the one or more processors, to cause the apparatus at least to:
monitor the failure detection resources for beam failure detection.

13. The apparatus of claim 4, wherein the one or more memories and the computer program code are further configured, with the one or more processors, to cause the apparatus at least to:
determine based on the monitored failure detection resources that a beam failure has occurred;
send an indication of beam failure towards a base station; and
participate in a beam recovery process with the base station.

14. The apparatus of claim 4, wherein the one or more memories and the computer program code are further configured, with the one or more processors, to cause the apparatus at least to:
in response to a partial beam failure occurring and one of the failure detection resources is in a failure condition, remove the reference signal in the failure condition from the N transmission configuration indication states and use the remaining N−1 transmission configuration indication states as the failure detection resources instead.

15. The apparatus of claim 14, wherein the one or more memories and the computer program code are further configured, with the one or more processors, to cause the apparatus at least to:
in response to N−1 resources being in a failure condition and a reference signal not in failure condition was not included in the N transmission configuration indication states, add the reference signal not in the failure condition to the N transmission configuration indication states and use the added reference signal for the beam failure detection.

* * * * *